(12) United States Patent
Taguchi

(10) Patent No.: US 12,276,810 B2
(45) Date of Patent: Apr. 15, 2025

(54) DRIVE APPARATUS AND EQUIPMENT

(71) Applicant: CANON KABUSHIKI KAISHA, Tokyo (JP)

(72) Inventor: Takayuki Taguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 734 days.

(21) Appl. No.: 17/533,530

(22) Filed: Nov. 23, 2021

(65) Prior Publication Data

US 2022/0171210 A1    Jun. 2, 2022

(30) Foreign Application Priority Data

Nov. 30, 2020    (JP) ................................ 2020-198283

(51) Int. Cl.
   *H04N 23/68*    (2023.01)
   *G02B 27/64*    (2006.01)
   *G03B 5/02*     (2021.01)

(52) U.S. Cl.
   CPC ............ *G02B 27/646* (2013.01); *G03B 5/02* (2013.01); *H04N 23/685* (2023.01); *G03B 2205/0007* (2013.01)

(58) Field of Classification Search
   CPC ...... G02B 27/64; G02B 27/646; H04N 23/52; H04N 23/54; H04N 23/55; H04N 23/68; H04N 23/682; H04N 23/685; H04N 23/687; G03B 2205/0007; G03B 2205/0015; G03B 2205/0038; G03B 2205/0053; G03B 2205/0069; G03B 5/02; G03B 17/55; G03B 30/00
   See application file for complete search history.

(56) References Cited

U.S. PATENT DOCUMENTS

| | | | |
|---|---|---|---|
| 2018/0164603 A1 | 6/2018 | Taguchi et al. | |
| 2020/0084877 A1 | 3/2020 | Ye et al. | |
| 2021/0092273 A1* | 3/2021 | Yamana | ............... H04N 23/672 |

FOREIGN PATENT DOCUMENTS

| | | |
|---|---|---|
| JP | 2016042113 A | 3/2016 |
| JP | 2019159268 A | 9/2019 |
| JP | 2020170963 A | 10/2020 |
| WO | 2018173903 A1 | 9/2018 |

* cited by examiner

*Primary Examiner* — Clayton E. LaBalle
*Assistant Examiner* — Fang-Chi Chang
(74) *Attorney, Agent, or Firm* — Canon U.S.A., Inc. IP Division

(57) ABSTRACT

A drive apparatus includes a first unit including a coil, a second unit including a magnet, and a third unit having an electronic device. The third unit is fixed to the first unit. The first unit and the third unit move relative to the second unit by a magnetic force between the coil and the magnet. The first unit includes a first opening and a second opening in a direction along a principal surface of the electronic device in an area overlapping the principal surface. The first unit is such that an induced current due to a magnetic field generated from the coil does not flow to a first portion located between the first opening and the second opening in the first unit.

20 Claims, 8 Drawing Sheets

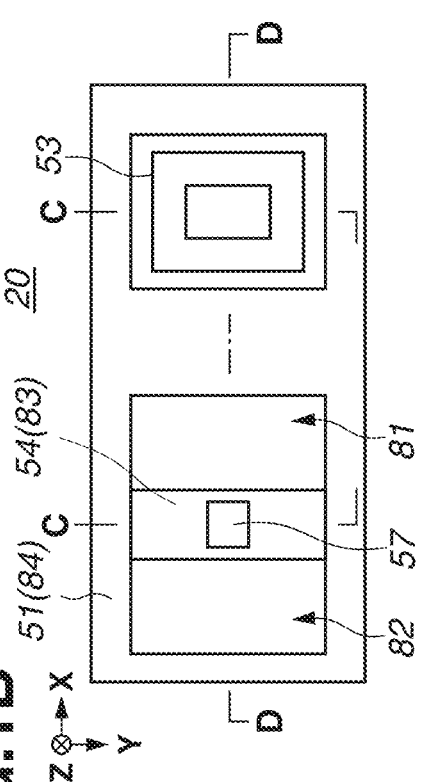
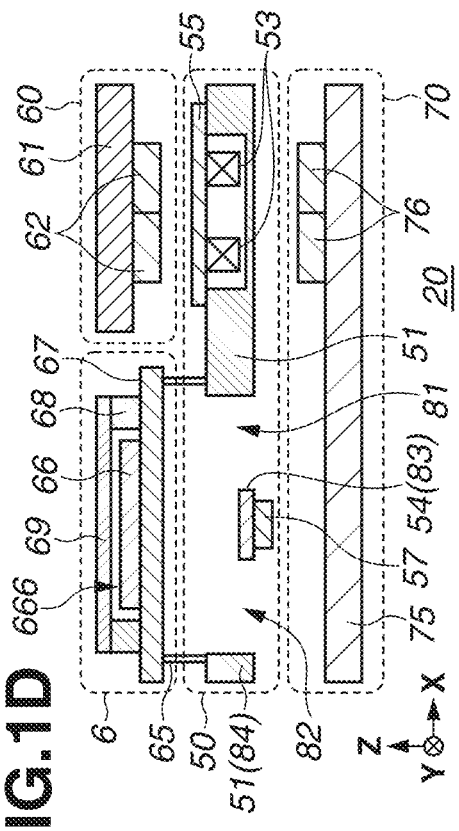
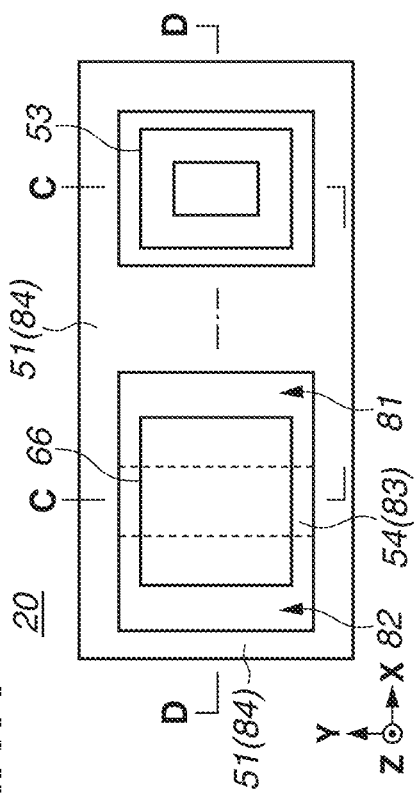
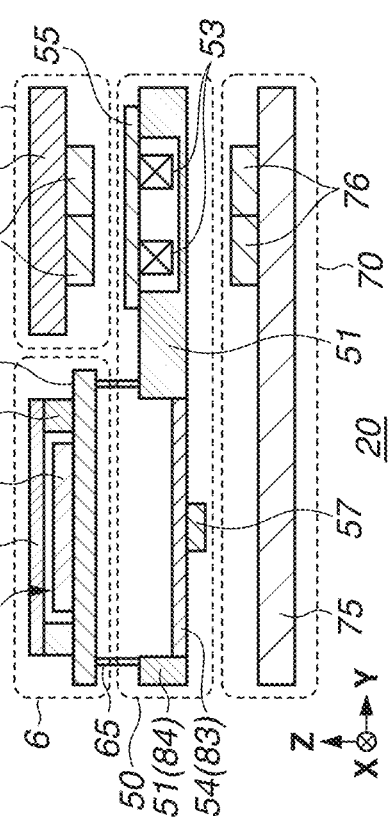

DRIVE APPARATUS AND EQUIPMENT

BACKGROUND

Field

The present disclosure relates to a drive apparatus.

Description of the Related Art

A drive apparatus that causes an electronic device to move by a magnetic force is used to, for example, cause an image capturing device to move for blur correction in a camera.

International Publication WO18/173903 discusses an image blur correction apparatus including a back side fixation/holding member, a movable frame for holding an image sensor, a suction board provided on the movable frame, and a sensor magnet provided on the back side fixation/holding member.

In the image blur correction apparatus discussed in International Publication WO18/173903, noise can be superimposed on a signal from the image sensor.

SUMMARY

The present disclosure is directed to providing a technique that is advantageous in preventing the generation of noise in an electronic device.

According to an aspect of the present disclosure, a drive apparatus includes a first unit including a coil, a second unit including a magnet, and a third unit including an electronic device, wherein the third unit is fixed to the first unit, and the first unit and the third unit are configured to move relative to the second unit by a magnetic force between the coil and the magnet, wherein the first unit includes a first opening and a second opening in a direction along a principal surface of the electronic device in an area overlapping the principal surface, and wherein the first unit is configured such that an induced current due to a magnetic field generated from the coil does not flow to a first portion located between the first opening and the second opening in the first unit.

Further features of the present disclosure will become apparent from the following description of exemplary embodiments with reference to the attached drawings.

BRIEF DESCRIPTION OF THE DRAWINGS

FIGS. 1A and 1B are plan views each illustrating a drive apparatus, and FIGS. 1C and 1D are sectional views of the drive apparatus.

DESCRIPTION OF THE EMBODIMENTS

Figure 2A:
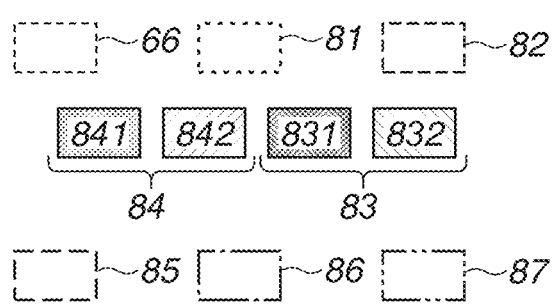
FIGS. 2A to 2H are schematic diagrams each illustrating the drive apparatus.

An exemplary embodiment for carrying out the present disclosure will be described below with reference to the drawings. In the following description and the drawings, configurations common to a plurality of drawings are denoted by common reference numerals.

The common configuration may be described by mutually referring to the plurality of drawings without notice in some cases. In addition, the description of the configuration denoted by the common reference numeral may be omitted in some cases.

A drive apparatus 20 will be described with reference to FIGS. 1A to 1D. FIG. 1A is a plan view illustrating the drive apparatus 20 as viewed from a front side thereof. FIG. 1B is a plan view illustrating the drive apparatus 20 as viewed from a back side thereof. FIG. 1C is a sectional view of the drive apparatus 20 taken along a line C-C in FIG. 1B. FIG. 1C is a sectional view of the drive apparatus 20 taken along a line D-D in FIG. 1B.

The drive apparatus 20 includes a movable unit 50 including a coil 53, a forward fixation unit 60 including a magnet 62, and a backward fixation unit 70 including a magnet 76, and an electronic unit 6 including an electronic device 66. The electronic unit 6 is fixed to the movable unit 50. The electronic unit 6 and the movable unit 50 are movable with respect to the forward fixation unit 60 and the backward fixation unit 70. The movable unit 50 and the electronic unit 6 move relatively to the fixation unit 60 in an X-direction by a magnetic force between the coil 53 and the magnet 62. The movable unit 50 and the electronic unit 6 move relatively to the backward fixation unit 70 in the X-direction by a magnetic force between the coil 53 and the magnet 76.

The movable unit 50 includes an opening 81 and an opening 82 in the X-direction along a principal surface 666 of the electronic device 66 in an area overlapping the principal surface 666. In an exemplary embodiment of the present disclosure, the opening 81 and the opening 82 are located between the electronic unit 6 and the backward fixation unit 70. The movable unit 50 is configured such that an induced current due to a magnetic field generated from the coil 53 does not flow to a partitioning portion 83 that is located between the opening 81 and the opening 82 in the movable unit 50.

The movable unit 50 may be configured such that the induced current due to the magnetic field generated by the coil 53 flows to a surrounding portion 84 that is not located between the opening 81 and the opening 82 in the movable unit 50. In this case, the movable unit 50 may be configured such that a current larger than the induced current flowing to the surrounding portion 84 does not flow to the partitioning portion 83.

The induced current will be described with reference to FIGS. 2A to 2H. FIG. 2A illustrates types of lines and hatching used for representing configurations illustrated in FIGS. 2B to 2H. Each configuration illustrated in FIG. 2A corresponds to a configuration indicated by the same type of line or hatching in FIGS. 2B to 2H. In FIGS. 2A to 2H, a dashed line indicates the contour of the electronic device 66, a short broken line indicates the opening 81, and a long broken line indicates the opening 82. In FIGS. 2A to 2H, a conductor 831 and/or an insulator 832 can constitute the partitioning portion 83, and a conductor 841 and/or an insulator 842 can constitute the surrounding portion 84. In FIGS. 2A to 2H, a dashed line indicates a closed loop path 85, a dashed-dotted line indicates a closed loop path 86, and an alternate long and dashed-two dotted line indicates a closed loop path 87.

In the movable unit 50 illustrated in FIGS. 2B to 2H, the closed loop path 85 is formed along the surrounding portion 84, the closed loop path 86 is formed along the opening 81, and the closed loop path 87 is formed along the opening 82. The opening 81 is defined by the right half of the surrounding portion 84 and the partitioning portion 83, and the opening 82 is defined by the left half of the surrounding portion 84 and the partitioning portion 83. The closed loop path 85 is constitutes the entire surrounding portion 84. The closed loop path 86 is defined by the right half of the surrounding portion 84 and the partitioning portion 83. The closed loop path 87 is defined by the left half of the surrounding portion 84 and the partitioning portion 83.

Figure 2B:
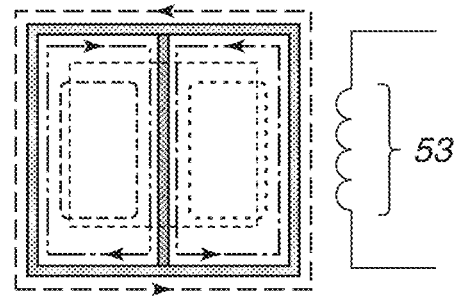

In the example illustrated in FIG. 2B, the entire partitioning portion 83 is formed of the conductor 831, the entire surrounding portion 84 is formed of the conductor 841, and the partitioning portion 83 and the surrounding portion 84 are electrically connected. In other words, each of the closed loop path 85, the closed loop path 86, and the closed loop path 87 is a conductive closed loop path. When a magnetic flux generated from the coil 53 interlinks with at least one of the closed loop paths 85, 86, and 87, a current (induced current) flows to the conductive closed loop paths 85, 86, and 87. A part of the current flows not only to the surrounding portion 84 but also to the partitioning portion 83. When the current flows to the partitioning portion 83, a magnetic flux is generated around the partitioning portion 83. When this magnetic flux interlinks with a closed loop (not illustrated) of a conductive path included in the electronic unit 6, a current (induced current) flows to the closed loop of the conductive path included in the electronic unit 6. This current causes noise in the electronic device 66.

Figure 2C:
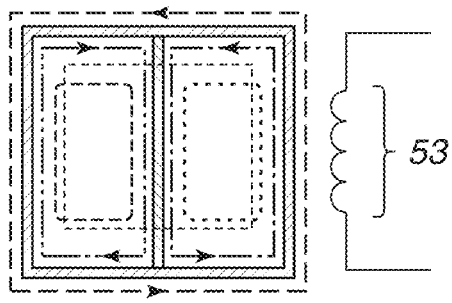

In the example illustrated in FIG. 2C, the entire partitioning portion 83 is formed of the insulator 832, and the entire surrounding portion 84 is formed of the insulator 842. In other words, each of the closed loop paths 85, 86, and 87 is an insulative closed loop path. Accordingly, the induced current due to the magnetic field generated from the coil 53 does not flow to the partitioning portion 83. Therefore, noise in the electronic device 66 can be reduced.

The induced current due to the magnetic field generated from the coil 53 rarely flows to the surrounding portion 84, either, so that noise in the electronic unit 6 can be reduced.

Figure 2D:
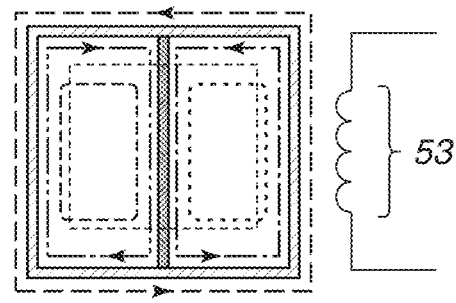

In the example illustrated in FIG. 2D, the entire partitioning portion 83 is formed of the conductor 831, and the entire surrounding portion 84 is formed of the insulator 842. In other words, each of the closed loop paths 85, 86, and 87 is an insulative closed loop path. Accordingly, the induced current due to the magnetic field generated from the coil 53 does not flow to the partitioning portion 83. Therefore, noise in the electronic device 66 can be reduced. The induced current due to the magnetic field generated from the coil 53 rarely flows to the surrounding portion 84. Therefore, noise in the electronic unit 6 can be reduced.

Figure 2E:
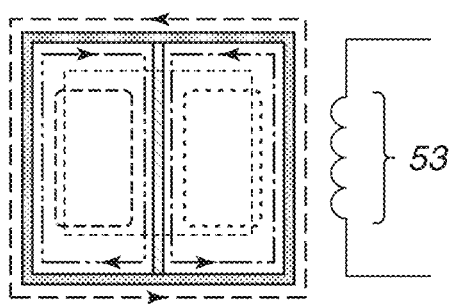

In the example illustrated in FIG. 2E, the entire surrounding portion 84 is formed of the conductor 841, and the entire partitioning portion 83 is formed of the insulator 832. In other words, the closed loop path 85 is a conductive closed loop path, and the closed loop paths 86 and 87 are insulative closed loop paths. Accordingly, the induced current due to the magnetic field generated from the coil 53 can flow to the surrounding portion 84. However, since the induced current due to the magnetic field generated from the coil 53 rarely flows to the partitioning portion 83, noise in the electronic device 66 can be reduced.

Figure 2F:
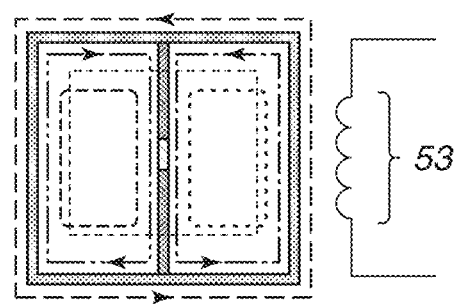

In the example illustrated in FIG. 2F, the entire surrounding portion 84 is formed of the conductor 841, and a central portion of the partitioning portion 83 is formed of the insulator 832, and peripheral portions of the partitioning portion 83 is formed of the conductor 831. In other words, the closed loop path 85 is a conductive closed loop path, and the closed loop paths 86 and 87 are insulative closed loop paths. Accordingly, the induced current due to the magnetic field generated from the coil 53 can flow to the surrounding portion 84. However, since the induced current due to the magnetic field generated from the coil 53 rarely flows to the partitioning portion 83, noise in the electronic device 66 can be reduced.

Figure 2G:
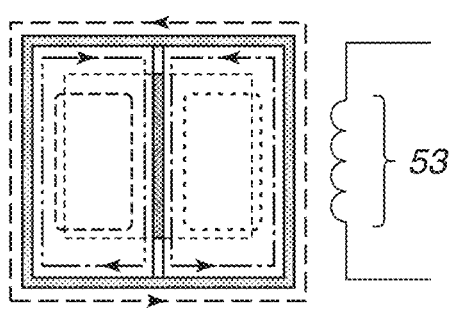

In the example illustrated in FIG. 2G, the entire surrounding portion 84 is formed of the conductor 841, the central portion of the partitioning portion 83 is formed of the conductor 831, and the peripheral portions of the partitioning portion 83 is formed of the insulator 832. In other words, the closed loop path 85 is a conductive closed loop path, and the closed loop paths 86 and 87 are insulative closed loop paths. Accordingly, the induced current due to the magnetic field generated from the coil 53 can flow to the surrounding portion 84. However, since the induced current due to the magnetic field generated from the coil 53 rarely flows to the partitioning portion 83, noise in the electronic device 66 can be reduced.

Figure 2H:
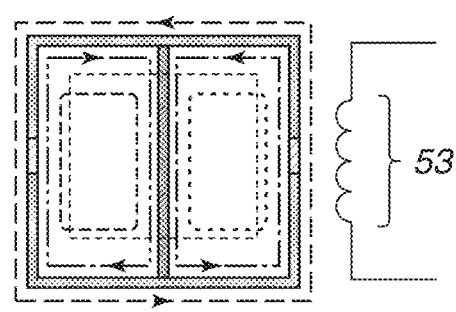

In the example illustrated in FIG. 2H, the entire partitioning portion 83 is formed of the conductor 831. In the surrounding portion 84, portions that are close to the partitioning portion 83 are formed of the conductor 841. In the surrounding portion 84, portions that are far from the partitioning portion 83 are formed of the insulator 842. In other words, the closed loop paths 85, 86, and 87 are insulative closed loop paths. The induced current due to the magnetic field generated from the partitioning portion 83 rarely flows to the partitioning portion 83. Therefore, noise in the electronic device 66 can be reduced. In addition, the induced current due to the magnetic field generated from the coil 53 rarely flows to the surrounding portion 84, either. Therefore, noise in the electronic device 66 can be further reduced.

The present exemplary embodiment described above illustrates the configurations in which the induced current due to the magnetic field generated from the coil 53 rarely flows to the partitioning portion 83 with reference to FIGS. 2E to 2H. It can be understood that the induced current due to the magnetic field generated from the coil 53 does not flow to the partitioning portion 83, as long as the closed loop paths 86 and 87 formed by the partitioning portion 83 are not conductive closed loop paths but insulative closed loop paths. Within this scope, the examples illustrated in FIGS. 2E to 2H may be modified or combined as appropriate.

According to the present exemplary embodiment, a magnetic flux other than the magnetic flux generated from the coil 53 can also interlink with the closed loop path due to the effect of geomagnetism, electronic waves, or the like. However, since the induced current due to the magnetic flux does not flow to the partitioning portion 83, noise in the electronic device 66 can be reduced. In the present exemplary embodiment, the configuration that the induced current due to the magnetic field generated from the coil 53 does not flow means that the induced current that can be generated in the partitioning portion 83 along with a time change of the magnetic field generated from the coil 53 is less than 1 µA.

Since the conductivity of the insulator forming the movable unit 50 has a value greater than "0", it is theoretically difficult to reduce the induced current to zero as long as there is a magnetic flux that interlinks with the closed loop path. Therefore, even if a very small induced current that does not affect the operation of the electronic device 66 flows to the partitioning portion 83 in practice, this case also falls within the range in which the induced current due to the magnetic field generated from the coil 53 does not flow to the partitioning portion 83.

The drive apparatus 20 illustrated in FIGS. 1A to 1D will be described in detail. The electronic unit 6 is fixed to the movable unit 50 with an appropriate fixation member 65 such as adhesive, a double-sided adhesive tape, or screwing. The electronic unit 6 includes a wiring board 67, on which the electronic device 66 is mounted, between the electronic device 66 and the partitioning portion 83. The wiring board 67 is, for example, a printed wiring board, and a resin wiring board or a ceramic wiring board can be used for the wiring board 67. The electronic device 66 and the wiring board 67 are electrically connected to each other by wire bonding connection or flip-chip connection. A package base member (not illustrated) including leads and a terminal such as a ball grid array (BGA), a land grid array (LGA), or a pin grid array (PGA) may be disposed between the electronic device 66 and the wiring board 67 so that the electronic device 66 and the wiring board 67 are electrically connected to each other via the package base member. The electronic unit 6 can include a lid body 69 and a frame body 68. The lid body 69 is provided on the opposite side of the wiring board 67 with respect to the electronic device 66. The frame body 68 is provided between the lid body 69 and the wiring board 67. The frame body 68 holds the lid body 69 in such a manner that the lid body 69 and the electronic device 66 are opposed to each other with a gap therebetween. The electronic device 66 is, for example, a semiconductor device, and includes wiring. When the above-described induced current flows to the partitioning portion 83 and the magnetic field is generated around the partitioning portion 83, the magnetic flux interlinks with the conductive closed loop path including the wiring of the electronic device 66, which causes induced noise in the electronic device 66. The conductive closed loop path including the wiring of the electronic device 66 may be formed only of the wiring of the electronic device 66, or may be formed of the wiring of the electronic device 66 and the wiring of the wiring board 67. The electronic device 66 may be an image capturing device such as a complementary metal-oxide-semiconductor (CMOS) image sensor. Alternatively, the electronic device 66 may be a display device such as an organic electroluminescence (EL) display. In a case where the electronic device 66 includes an analog circuit as in an image capturing device and a display device, this analog circuit is more likely to be adversely affected by induced noise. For this reason, the drive apparatus 20 according to the present exemplary embodiment is preferably used in a case where the electronic device 66 is an image capturing device or a display device. However, the electronic device 66 is not limited to devices including an analog circuit, as long as malfunction or noise may occur due to magnetism. If the distance between the partitioning portion 83 and the electronic device 66 is extremely large, the effect of the induced current flowing to the partitioning portion 83 on the electronic device 66 is not so large. However, if the distance between the partitioning portion 83 and the electronic device 66 is less than 10 mm, it needs to consider particularly the effect of the induced current flowing to the partitioning portion 83 on the electronic device 66.

The partitioning portion 83 and the surrounding portion 84 of the movable unit 50 may be integrally configured as an integrated member (component), or may be configured as separate members (components). In this example, the partitioning portion 83 constitutes a partitioning member 54 and the surrounding portion 84 is constitutes a holding member 51. The partitioning portion 83 is located between the opening 81 and the opening 82. The holding member 51 and the partitioning member 54 define the opening 81 and the opening 82. The holding member 51 holds the coil 53. Specifically, the coil 53 is mounted on a wiring board 55 such as a flexible printed circuit (FPC), and the wiring board 55 is fixed to the holding member 51. A current is supplied to the coil 53 through wiring formed on the wiring board 55. The holding member 51 holds the partitioning member 54. The electronic unit 6 is fixed to the holding member 51 with the fixation member 65. The magnet 57 is fixed to the partitioning member 54.

In such a manner, since the partitioning portion 83 constitutes the partitioning member 54, the configuration in which the induced current due to the magnetic field generated from the coil 53 does not flow to the partitioning member 54 may be employed. As illustrated in FIGS. 2C to 2H, the partitioning member 54 may be configured not to form a conductive closed loop path. For example, the partitioning member 54 may be formed of an insulator, the holding member 51 may be formed of an insulator, and the partitioning member 54 formed of a conductor and the holding member 51 formed of a conductor may be insulated by an insulator.

The magnet 62 included in the forward fixation unit 60 is provided at a position that can be opposed to the coil 53. In the process of relative movement, the coil 53 can be temporarily located at a position that is not opposed to the magnet 62. The forward fixation unit 60 can include a yoke 61 that is coupled to the magnet 62.

The yoke 61 may be disposed at a position overlapping at least the magnet 62. In this example, the forward fixation unit 60 is disposed so as not to overlap the electronic unit 6 to prevent the forward fixation unit 60 from inhibiting the movement of the electronic unit 6. In this example, the yoke 61 is disposed so as not to overlap the electronic device 66 to prevent light toward the electronic device 66 or light from the electronic device 66 from being blocked.

The magnet 76 included in the backward fixation unit 70 is provided at a position that can be opposed to the coil 53. In the process of relative movement, the coil 53 can be temporarily located at a position that is not opposed to the magnet 76. The backward fixation unit 70 can include a yoke 75 that is coupled to the magnet 76.

The yoke 75 may be disposed at a position overlapping at least the magnet 76. In this example, the yoke 75 includes a portion that extends to a position overlapping the electronic unit 6 and is opposed to the partitioning portion 83.

The forward fixation unit 60 and the backward fixation unit 70 of the drive apparatus 20 can be collectively referred to as a fixation unit. The coil 53 is disposed between the magnet 76 of the backward fixation unit 70 and the magnet 62 of the forward fixation unit 60. In the process of relative movement, the coil 53 can be temporarily located at a position that is not between the magnet 76 and the magnet 62. At least one of the forward fixation unit 60 and the backward fixation unit 70 including the magnet 76 can be omitted.

The movable unit 50 can include a magnet 57 that is fixed to the partitioning portion 83. The portion of the yoke 75 that is opposed to the partitioning portion 83 is opposed to the magnet 57. The magnet 57 of the movable unit 50 attracts the yoke 75 of the backward fixation unit 70, thereby enabling a stable relative movement.

While FIGS. 1A to 1D illustrate the configuration in which the movable unit 50 and the electronic unit 6 move relatively to each other in the X-direction, the coil may be disposed in a Y-direction to allow the movable unit 50 and the electronic unit 6 to move relatively to each other in the Y-direction.

The present exemplary embodiment described above illustrates the configuration in which the forward fixation unit 60 and the backward fixation unit 70 are fixed to a housing of equipment including the drive apparatus 20, and the electronic unit 6 and the movable unit 50 are movable. However, any configuration can be employed as long as the electronic unit 6 and the movable unit 50 can move relatively to the forward fixation unit 60 and the backward fixation unit 70. Accordingly, the configuration may be changed to a configuration in which the forward fixation unit 60 and the backward fixation unit 70 are movable with respect to the housing of the equipment including the drive apparatus 20 and the electronic unit 6 and the movable unit 50 are fixed thereto. The magnets 57, 62, and 76 described above are typically permanent magnets, but instead may be electromagnets.

The drive apparatus 20 can be mounted on various types of equipment. The equipment including the drive apparatus 20 can include a control unit that supplies a current to the coil 53. The equipment including the drive apparatus 20 can include a detection unit that detects a physical quantity corresponding to a displacement of the electronic device 66 (electronic unit 6). The displacement of the electronic device 66 (electronic unit 6) can be corrected by the relative movement in the drive apparatus 20. This correction can be utilized for blur correction and the like. The detection unit that detects the physical quantity corresponding to the displacement of the electronic device 66 (electronic unit 6) may be, for example, an acceleration sensor that is displaced in the same manner as the displacement of the electronic device 66. The detection unit is disposed in advance such that the detection unit is displaced in the same manner as the displacement of the electronic device 66, thereby making it possible to detect the physical quantity corresponding to the displacement of the electronic device 66 (electronic unit 6).

An image capturing apparatus including a blur correction unit according to the present exemplary embodiment will be described below with reference to FIGS. 3A to 6B.

Figure 4A:
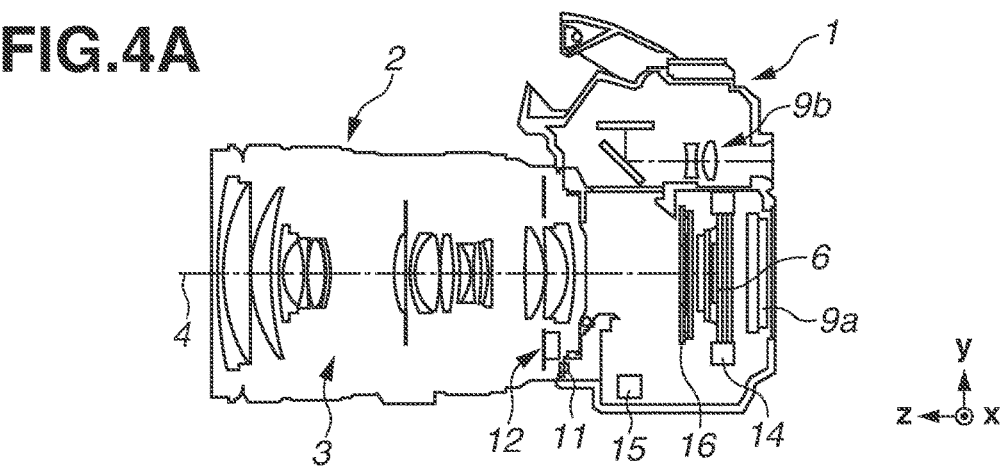
FIG. 4A is a sectional view of an image capturing apparatus.
Figure 4B:
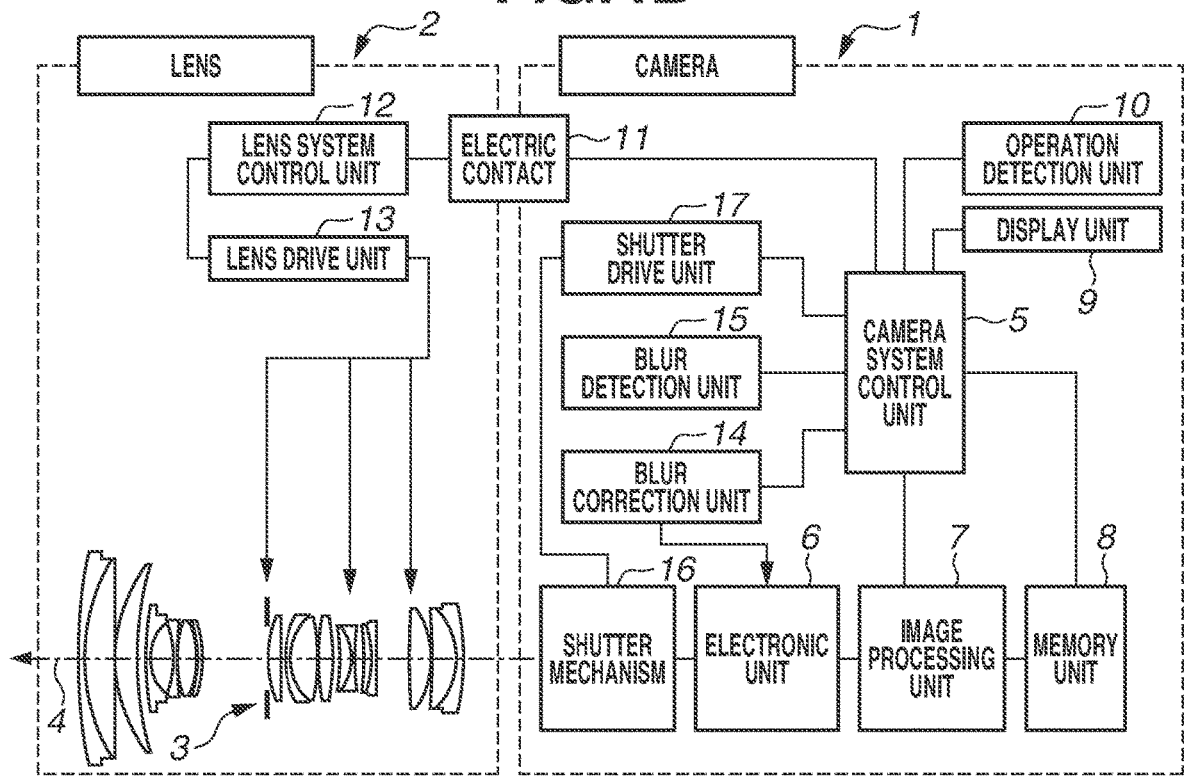
FIG. 4B is a block diagram illustrating an electrical configuration of a camera body.

FIG. 4A is a mid-section cross sectional view of the image capturing apparatus according to the present exemplary embodiment. FIG. 4B is a block diagram illustrating an electrical configuration of the image capturing apparatus. Those components denoted by the same reference numerals in FIGS. 4A and 4B correspond to each other.

As illustrated in FIGS. 4A and 4B, a camera lens 2 is attached to a camera body 1, which serves as image capturing equipment, thereby forming a camera. The camera lens 2 includes an image capturing optical system 3 and a lens system control unit 12. The image capturing optical system 3 includes a plurality of lenses that capture object light from outside. The lens system control unit 12 controls a system on the camera lens 2 side. The camera body 1 includes the electronic unit 6 that captures the object light that has passed through the camera lens 2, a display 9a, a viewfinder 9b, a blur correction unit 14, a blur detection unit 15, a shutter mechanism 16, and a shutter drive unit 17. The lens system control unit 12 and a camera system control unit 5 enables supply of power from the camera body 1 and communicate with each other via an electric contact 11.

FIG. 4B is a block diagram illustrating an electrical configuration of the camera body 1. The camera system that includes the camera body 1 and the camera lens 2 includes an image capturing unit, an image processing unit, a recording/reproduction unit, and a control unit. The image capturing unit includes the image capturing optical system 3, the electronic unit 6, and the shutter mechanism 16. The image processing unit includes an image processing unit 7. The recording/reproduction unit includes a memory unit 8 and a display unit 9, and the display unit 9 includes the display 9a and the viewfinder 9b.

The control unit includes the camera system control unit 5, an operation detection unit 10, the lens system control unit 12, a lens drive unit 13, the blur correction unit 14, and the blur detection unit 15. The lens drive unit 13 can drive a focus lens, a diaphragm, and the like. The blur detection unit 15 can detect wobbling of the apparatus during rotation including a rotation about an optical axis. A vibration gyroscope and the like can be used as the blur detection unit 15. The blur correction unit 14 is a mechanism that causes the electronic unit 6 to parallelly translate to a plane orthogonal to an optical axis 4 and to rotate about an optical axis 4. A specific structure of this mechanism will be described below.

The image capturing unit is an optical processing system that includes the electronic unit 6 configured to photoelectrically convert a light beam that passes through the image capturing optical system 3 and is collected in a light-receiving unit. A focus evaluation amount/proper exposure amount can be obtained from the electronic unit 6. The image capturing optical system 3 is appropriately adjusted based on this signal, thereby exposing the electronic unit 6 to an appropriate amount of object light and forming an object image in the vicinity of the electronic unit 6.

The shutter mechanism 16 causes a shutter curtain to run, thereby controlling whether the object image reaches the electronic unit 6. The shutter drive unit 17 controls driving of the shutter mechanism 16 in response to an instruction from the camera system control unit 5.

The image processing unit 7 includes an analog-to-digital (A/D) converter, a white balance adjustment circuit, a gamma correction circuit, and an interpolation calculation circuit, and can generate an image for recording. A color interpolation processing unit is included in the image processing unit 7, and performs color interpolation (demosaicing) processing based on signals of a Bayer array to generate a color image. The image processing unit 7 compresses images, moving images, sounds, and the like using a predetermined method.

The memory unit 8 includes an actual storage unit. The camera system control unit 5 outputs data to the storage unit of the memory unit 8 and displays an image to be presented to a user on the display unit 9.

The camera system control unit 5 generates a timing signal for image capturing and outputs the generated timing signal. In response to an external operation, the camera system control unit 5 controls the image capturing system, the image processing system, and the recording/reproduction system. For example, when the operation detection unit 10 detects pressing of a shutter release button (not illustrated), the camera system control unit 5 controls driving of the electronic unit 6 and operation and compression processing of the image processing unit 7. In addition, the camera system control unit 5 controls the state of each segment of an information display apparatus on which information is displayed by the display unit 9. The display 9a is a touch panel and is connected to the operation detection unit 10.

The camera system control unit 5 sends an instruction to the lens system control unit 12 via the electric contact 11, and the lens system control unit 12 appropriately controls the lens drive unit 13.

As described above, in response to a user operation detected by the operation detection unit 10, the operation of each unit of the camera body 1 is controlled to enable capturing of still images and moving images.

To control the blur correction unit 14 in the camera body 1, the blur correction unit 14 to be described below is operated based on a signal from the blur detection unit 15. The generation of a target value by the blur detection unit 15 and driving control of the blur correction unit 14 are controlled by the camera system control unit 5, and the camera system control unit 5 corresponds to a driving control unit.

Along with the recent improvement in the performance of image capturing equipment, a blur correction mechanism has been increasingly employed in image capturing equipment. Examples of a blur correction method include a method for moving an optical lens in a direction orthogonal to an optical axis and a method for moving the electronic unit 6 in the direction orthogonal to the optical axis. In the method for moving the electronic unit 6, typically a blur correction is performed while the electronic unit 6 is moved by a voice coil motor system including a magnet and a coil. For example, to smoothly drive the electronic unit 6, a ball member may be disposed between the backward fixation unit 70 and the electronic unit 6. To prevent omission of the ball member and wobbling of the electronic unit 6 in the optical axis direction, the magnet 57 may be disposed on the fixation unit side, and a suction board and the partitioning member 54 that holds the suction board may be disposed on the movable unit side. The electronic unit 6 may be constantly pressed against the fixation unit using a magnetic force. It is known that in the voice coil motor method, an electromagnetic wave that is generated from a coil affects electronic equipment.

However, if a holding member is disposed near the electronic unit 6, an induced current can be induced in the holding member due to a magnetic field generated from the coil. When the magnetic field secondarily generated by the induced current induced in the holding member reaches the electronic unit 6, the magnetic field can cause magnetic noise that may have an adverse effect on an image.

In view of the above, the present exemplary embodiment provides image capturing equipment including an image blur correction mechanism capable of reducing a magnetic field to be transmitted to an image capturing sensor unit from a camera shake correction unit with a simple configuration.

EXAMPLE 1

Figure 3A:
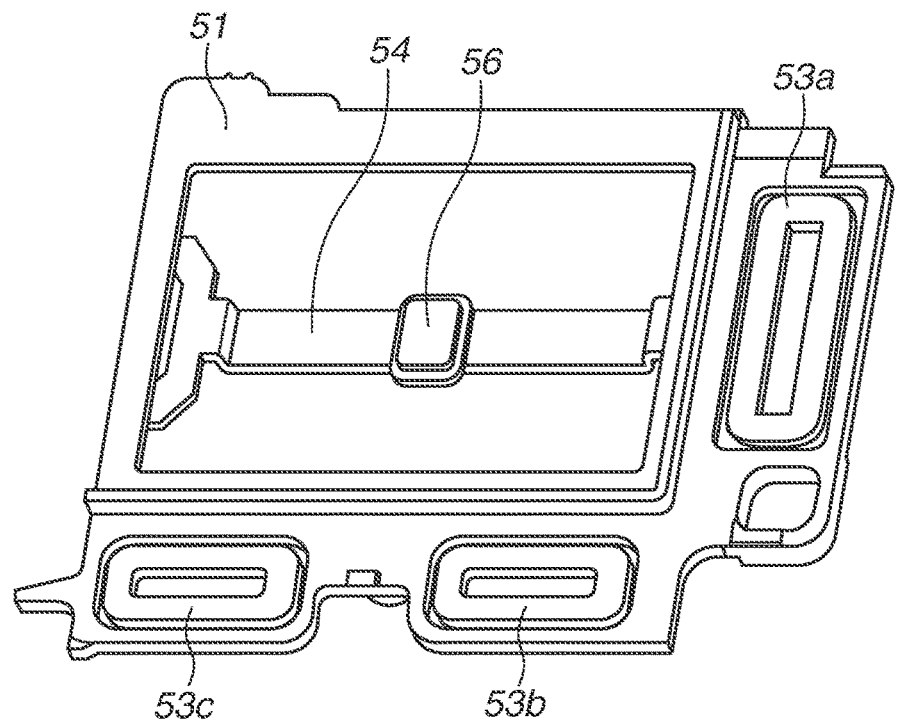
FIGS. 3A and 3B are schematic diagrams each illustrating the drive apparatus.
Figure 3B:
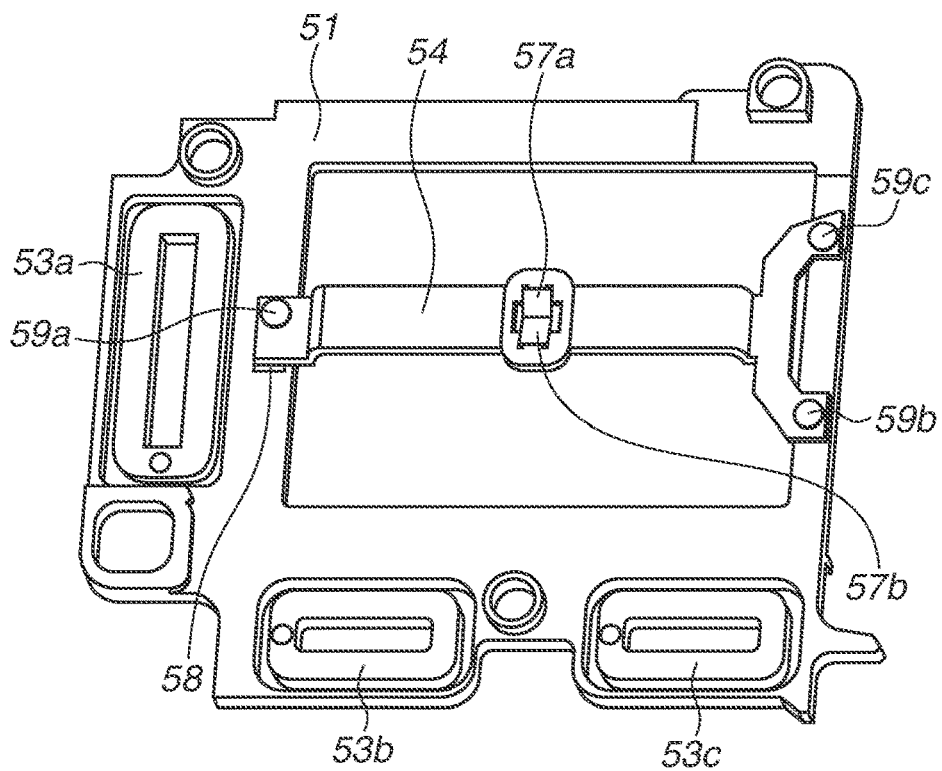
Figure 4C:
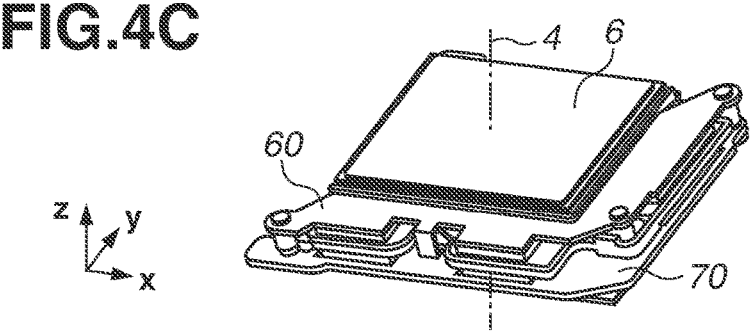
FIG. 4C is a perspective view of the drive apparatus.
Figure 5:
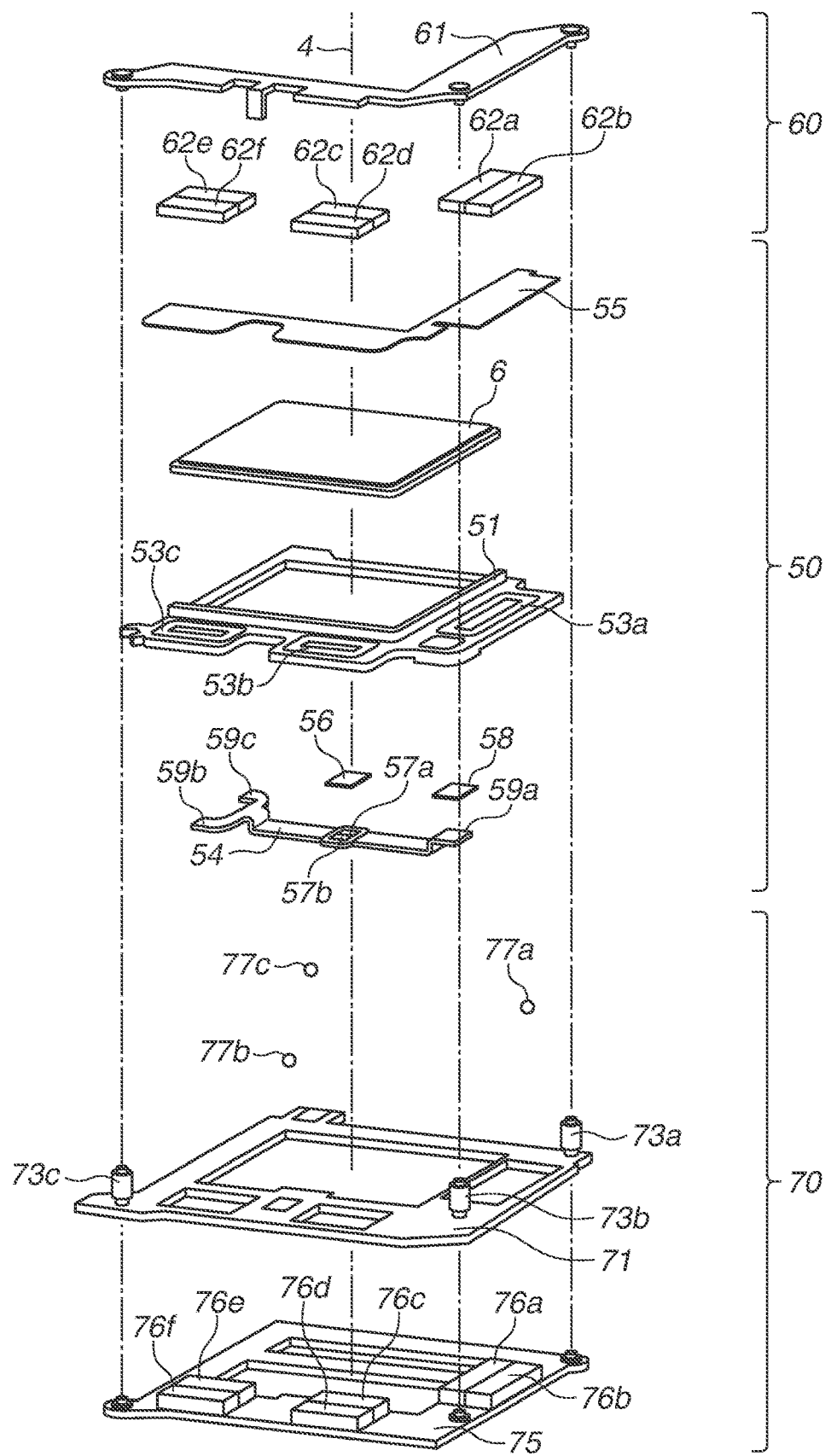
FIG. 5 is an exploded perspective view of the drive apparatus.

The drive apparatus 20 including the electronic unit 6 will be described with reference to FIGS. 3A and 3B. FIG. 4C is a perspective view of the drive apparatus 20. FIG. 5 is an exploded perspective view of the drive apparatus 20. FIG. 3A is a perspective view illustrating a part of the movable unit 50. FIG. 3B is a perspective view illustrating the part of the movable unit 50 of FIG. 3A as viewed from the back side. In the coordinate system illustrated in FIGS. 4A and 4C, the camera lens 2 is disposed in a positive direction of the Z-axis.

In FIGS. 4A and 4C, a vertical line (Z-axis direction) indicates a direction parallel to the optical axis 4. The drive apparatus 20 illustrated in FIGS. 3A and 3B can include the electronic unit 6, the movable unit 50, the forward fixation unit 60, and the backward fixation unit 70. The movable unit 50, the forward fixation unit 60, and the backward fixation unit 70 constitute the above-described blur correction unit 14. The movable unit 50 includes the holding member 51, coils 53a, 53b, and 53c, and the wiring board 55 such as a flexible printed circuit board. The movable unit 50 further includes the partitioning member 54, a yoke 56, magnets 57a and 57b, a sheet material 58, and fixation portions 59a, 59b, and 59c including screws.

The forward fixation unit 60 includes the yoke 61 and magnets 62a, 62b, 62c, 62d, 62e, and 62f. The backward fixation unit 70 includes a base plate 71, spacers 73a, 73b, and 73c, and the yoke 75. The backward fixation unit 70 further includes magnets 76a, 76b, 76c, 76d, 76e, and 76f and rolling balls 77a, 77b, and 77c. The holding member 51 corresponds to a first unit in the claims. The rolling balls 77a, 77b, and 77c each correspond to a support member. The forward fixation unit 60 and the backward fixation unit 70 each correspond to a fixation unit. The partitioning member 54 corresponds to a second member in the claims. The fixation portions 59a, 59b, and 59c including screws and the sheet material 58 each correspond to a fixation portion.

The yoke 61 and the magnets 62a, 62b, 62c, 62d, 62e, and 62f disposed on the forward fixation unit 60 and the yoke 75 and the magnets 76a, 76b, 76c, 76d, 76e, and 76f disposed on the backward fixation unit 70 form a magnetic circuit and constitute a closed magnetic path. The magnets 62a, 62b, 62c, 62d, 62e, and 62f are bonded and fixed to the yoke 61 in an adsorbed state. Similarly, the magnets 76a, 76b, 76c, 76d, 76e, and 76f are bonded and fixed to the yoke 75 in an adsorbed state. Each magnet is magnetized in the direction of the optical axis 4. Combinations of adjacent magnets, specifically, the magnets 62a and 62b, the magnets 62c and 62d, the magnets 62e and 62f, the magnets 76a and 76b, the magnets 76c and 76d, and the magnets 76e and 76f, are magnetized in different directions. Combinations of magnets that are opposed to each other, specifically, the magnets 62a and 76a, the magnets 62b and 76b, the magnets 62c and 76c, the magnets 62d and 76d, the magnets 62e and 76e, and the magnets 62f and 76f, are magnetized in the same direction. With this configuration, a magnetic flux with a high density is generated between the yoke 61 and the yoke 75 in the direction of the optical axis 4.

The spacers 73a, 73b, and 73c are disposed at predetermined intervals between the yoke 61 and the yoke 75. The movable unit 50 is disposed between the yoke 61 and the yoke 75 with a gap therebetween. A cylindrical side surface portion of each of the spacers 73a, 73b, and 73c is provided with rubber and forms a mechanism end portion (i.e., stopper) of the movable unit 50.

The base plate 71 is provided with holes to match the areas of the magnets 76a, 76b, 76c, 76d, 76e, and 76f, and the surfaces of the magnets 76a, 76b, 76c, 76d, 76e, and 76f protrude from the holes. The base plate 71 and the yoke 75 are fixed to each other with screws (not illustrated), and the magnets 76a, 76b, 76c, 76d, 76e, and 76f that are larger than the base plate 71 in the thickness direction are fixed such that the magnets 76a, 76b, 76c, 76d, 76e, and 76f project from the base plate 71. The yoke 75 is formed in a figure of eight. This shape will be described in detail below together with the description of the partitioning member 54.

Each element is fixed to the holding member 51, thereby forming the movable unit 50. The holding member 51 is formed of a conductive member. The electronic unit 6, the wiring board 55, and the partitioning member 54 are mounted on the holding member 51. Further, the coils 53a, 53b, and 53c are mounted on the surface of the wiring board 55 that faces the backward fixation unit 70 (in a negative direction of the Z-axis). The wiring board 55 serves as a mounting member. The wiring board 55 supplies power for driving to the coils 53a, 53b, and 53c. The wiring board 55 electrically communicates with an external apparatus via a connector (not illustrated). The axial direction of a hollow portion formed by each winding wire of the coils 53a, 53b, and 53c is substantially parallel to the optical axis 4. The coils 53a, 53b, and 53c are disposed substantially on the same plane with the electronic unit 6. Further, a magnetic sensor (not illustrated) is mounted in the hollow portion inside of the winding wire of each of the coils 53a, 53b, and 53c. The magnetic sensor (not illustrated) can detect the position of the movable unit 50 that has moved to a plane substantially orthogonal to the optical axis 4 by using the above-described magnetic circuit. For example, a Hall element can be used as the magnetic sensor. The magnetic sensor is also mounted on the wiring board 55 and electrically communicates with an external apparatus through a connector (not illustrated). The partitioning member 54 that is formed of a conductor (conductive metal member) is fixed to the holding member 51 with the fixation portions 59a, 59b, and 59c.

In this case, the fixation portion 59a is provided on one of two short sides facing each other in the frame-like holding member 51, and the fixation portions 59b and 59c are provided on the other of the two short sides facing each other. The partitioning member 54 extends in a direction along two long sides facing each other in the frame-like holding member 51. A distance between the fixation portion 59a and the fixation portion 59b and a distance between the fixation portion 59a and the fixation portion 59c are greater than a distance between the fixation portion 59b and the fixation portion 59c.

The configuration of the partitioning member 54 will now be described with reference to FIGS. 3A and 3B. The partitioning member 54 is a plate-like member or a rod-like member that overlaps the electronic device 66. The movable unit 50 includes the plurality of fixation portions 59a, 59b, and 59c that fix the holding member 51 to a plurality of end portions of the partitioning member 54.

A part of the fixation portion 59a, which is one of the plurality of fixation portions 59a, 59b, and 59c, is formed of an insulating material (non-conductive material). FIGS. 3A and 3B are perspective views illustrating only the holding member 51, the coil 53, the partitioning member 54, the yoke 56, the magnet 57, the sheet material 58, and the fixation portions 59. FIG. 3B is a perspective view of the movable unit 50 illustrated in FIG. 3A as viewed from the back side. As illustrated in FIG. 3B, the partitioning member 54 is fixed to the holding member 51 at three end portions thereof with screws included in the fixation portions 59a, 59b, and 59c. In this case, a non-conductive sheet material 58 is disposed between the partitioning member 54 and the holding member 51 at the fixation portion 59a. The screw of at least the fixation portion 59a among the three fixation portions 59a, 59b, and 59c is coated with a non-conductive material such as resin. The provision of the fixation portion 59a using the screw coated with the non-conductive sheet material 58 and the non-conductive coating material enables the holding member 51 and the partitioning member 54 to be fixed to each other via the non-conductive material on the surfaces to be fixed with the fixation portion 59a.

In this example, the screw coated with the coating material made of the non-conductive material such as resin is used for the fixation portion 59a. However, any configuration may be used as long as the portion where the holding member 51 and the partitioning member 54 are fixed to each other via a non-conductive material at the fixation portion 59a. Accordingly, the fixation portion 59a may be made of a non-conductive material. For example, a fixation portion including a screw made of resin, or a fixation portion coated with a non-conductive material may be used. Also, the sheet material 58 may have a different configuration from the above as long as it can maintain the contact surface between the holding member 51 and the partitioning member 54 nonconductive. Accordingly, the non-conductive coating material corresponding to the sheet material 58 may be provided on the holding member 51 or the partitioning member 54. Alternatively, one of the holding member 51 and the partitioning member 54 is coated with a conductive material, and the other of the holding member 51 and the partitioning member 54 is coated with an insulating material to be insulated from the contacting member.

The sheet material 58 is not limited to a sheet-like material, but instead may have any shape as long as it can keep the contact surface between the holding member 51 and the partitioning member 54 nonconductive, such as a washer made of resin. A non-conductive double-sided adhesive tape or non-conductive adhesive may be used for the fixation portions 59a, 59b, and 59c.

The partitioning member 54 is provided with a hole to avoid the areas of the magnets 57a and 57b, and the yoke 56 is bonded to the surface of the magnet 57 that faces the electronic unit 6. The magnet 57 is disposed at a position overlapping the vicinity of the center of the electronic unit 6 when the electronic unit 6 is projected in the direction of the optical axis 4. Each magnet is magnetized in the direction of the optical axis 4, and the magnets 57a and 57b, which are a combination of adjacent magnets, are magnetized in different directions.

Next, the role of each magnet 57 that is held by the partitioning member 54 will be described. Since the partitioning member 54 holds a magnetic material (magnet 57), the partitioning member 54 and the backward fixation unit 70 attract each other by a magnetic force between the backward fixation unit 70 and the magnetic material (magnet 57) of the movable unit 50. In this example, the magnet 57 is provided on the movable unit 50 so that the partitioning member 54 and the backward fixation unit 70 attract each other. Alternatively, the magnet 57 may be provided on the backward fixation unit 70 and the partitioning member 54 may serve as a magnetic material. As illustrated in FIG. 5, the yoke 75 is formed with a figure of eight as described above. A side that passes through a central portion of the yoke 75 is opposed to the partitioning member 54. Accordingly, the magnet 57 is opposed to the yoke 75. Since the yoke 75 is formed of a magnetic material, an attractive force is generated due to the magnetic force between the yoke 75 and the magnet 57. By the attraction due to the magnetic force, an attractive force acts in the direction of the optical axis 4 to attract the movable unit 50 including the partitioning member 54, the holding member 51, and the electronic unit 6 to the backward fixation unit 70 side. This attractive force enables the holding member 51, the rolling balls 77, and the base plate 71 to be held with no gap, without inhibiting the movement of the rolling balls 77 in a direction perpendicular to the optical axis 4 of the movable unit 50. This accordingly prevents unwanted movement of the movable unit 50, such as wobbling, in a direction parallel to the direction of the optical axis 4. As described above, the magnet 57 is disposed at a position overlapping the center of the electronic unit 6. This configuration prevents the attractive forces to be applied to the rolling balls 77a, 77b, and 77c from being largely different from one another. In this configuration, the partitioning member 54 holds the magnet 57. However, any configuration can be employed as long as an attractive force for attracting the movable unit 50 toward the backward fixation unit 70 can be obtained. Accordingly, the partitioning member 54 may include a magnetic material and a magnet may be provided on the yoke 75 side. Alternatively, a magnetic material may be used as the partitioning member 54 and a magnet may be provided on the yoke 75 side.

In the above-described configuration, the driving control unit causes a current to flow to the coils 53a, 53b, and 53c, thereby generating a force according to the Fleming's left-hand rule to enable the movable unit 50 to move. Furthermore, a feedback control can be performed using a signal from the above-described magnetic sensor (not illustrated). The current caused to flow to the coils 53a, 53b, and 53c is controlled by appropriately controlling the value of the signal from the magnetic sensor, thereby allowing movement in a translation direction within a plane orthogonal to the optical axis 4 and in a rotational direction about an axis that is substantially parallel to the optical axis 4. For example, the current caused to flow to the coil 53a is controlled to enable the movable unit 50 to translate and move in a direction parallel to the X-axis. The current caused to flow to the coils 53b and 53c is controlled to enable the movable unit 50 to translate and move in a direction parallel to the Y-axis, or to rotate and move about an axis parallel to the optical axis 4. Various control methods, including a feedback control, have already been proposed, and thus detailed descriptions are herein omitted.

When causing a current to flow to a coil, the driving control unit according to the present example performs a pulse-width modulation (PWM) control for controlling a duty ratio of a pulse width to control a driving voltage. In the PWM control, the voltage is controlled by varying the duty ratio of a high-frequency alternating signal. A low-frequency direct current generated due to the driving voltage controlled by the PWM control and a high-frequency alternating current generated due to the driving frequency controlled by the PWM control with a small amplitude flow to the coil in a superimposed manner. Thus, when a current is caused to flow to a coil, a magnetic field is generated from the coil and the magnetic field reaches the electronic unit 6, thereby causing magnetic noise in a video signal of the electronic unit 6. It is known that particularly the magnetic field generated due to a variation in a high-frequency current due to a driving frequency controlled by the PWM control affects a video signal of the electronic unit 6.

As illustrated in FIGS. 3A and 3B, the partitioning member 54 is formed of a plate-like metal member and is connected to the holding member 51. The partitioning member 54 is disposed in this manner, thereby achieving thinning of the drive apparatus 20.

However, the configuration in which the electronic unit 6, the coil 53, and the partitioning member 54 are disposed on the movable unit 50 and the partitioning member 54 includes a portion that is located closer to the electronic unit 6 has the following issues.

When the magnetic field generated from the partitioning member 54 reaches the electronic unit 6, the magnetic field causes magnetic noise and affects an image obtained by the electronic unit 6. The effect of the magnetic field that reaches the electronic unit 6 from the coil can be reduced, for example, by providing a shield structure between the coil and the electronic unit 6, or by increasing the distance between the coil and the electronic unit 6. However, in the configuration of the electronic unit 6 and the partitioning member 54 as in the present example, the magnitude of the magnetic field that reaches the electronic unit 6 from the partitioning member 54 is large and thus the effect of magnetic noise is large.

Accordingly, in Example 1, as illustrated in FIGS. 3A and 3B, the fixation portion formed of a non-conductive material is provided between the holding member 51 and the partitioning member 54 at the fixation portion 59a when the holding member 51 and the partitioning member 54 are connected to each other, thereby reducing the effect of the magnetic field generated from the partitioning member 54 on the electronic unit 6, while achieving thinning of the drive apparatus 20. The effect of the magnetic field generated from the coil 53 and the advantageous effect of providing the fixation portion formed of a non-conductive material between the holding member 51 and the partitioning member 54 will be described with reference to FIGS. 6A and 6B. For reference, the contour of the electronic unit 6 is indicated by a dashed line.

Figure 6A:
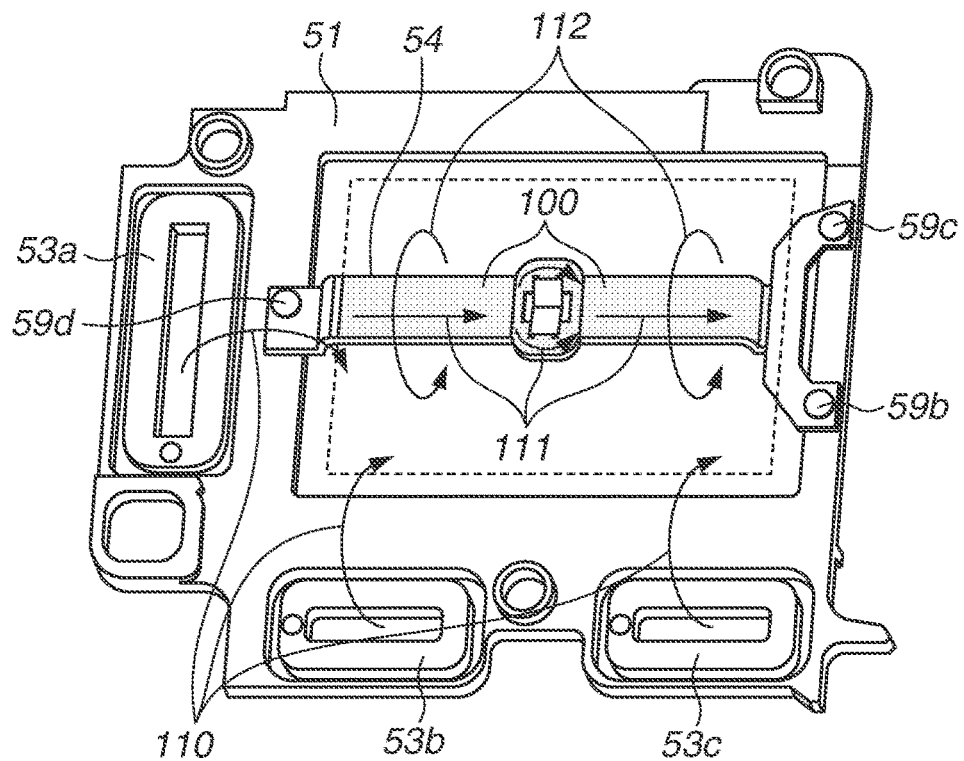
FIGS. 6A and 6B are schematic views each illustrating the drive apparatus.
Figure 6B:
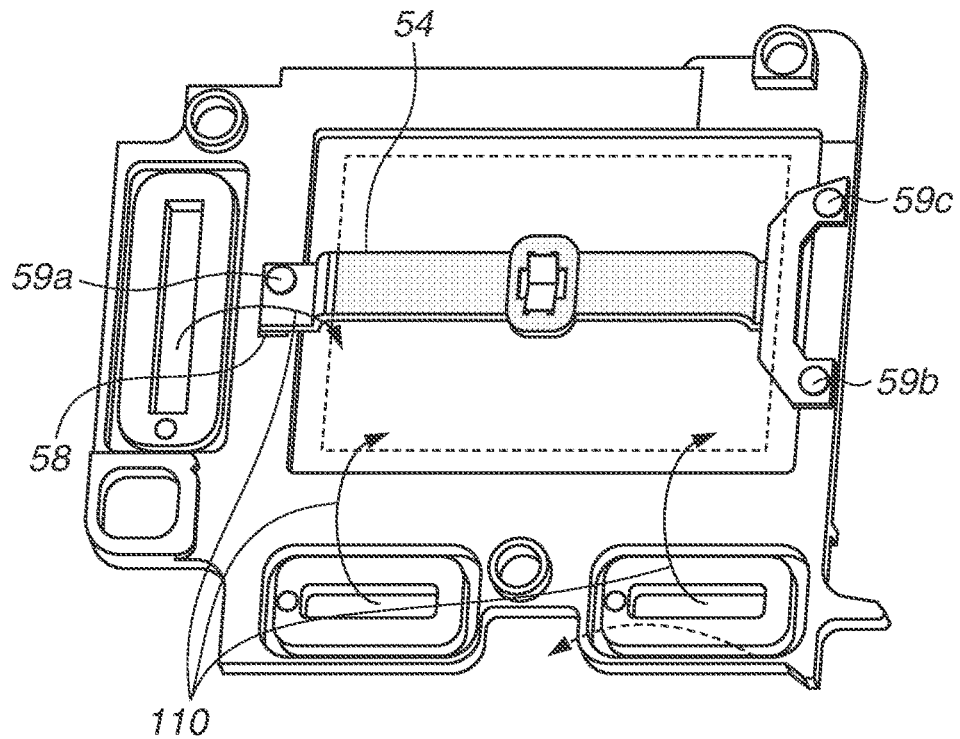

FIGS. 6A and 6B are schematic views illustrating the magnetic field generated from the coil 53, the induced current generated in the partitioning member 54, and the magnetic field generated due to the induced current in the perspective view illustrate in FIG. 3B. FIG. 6A illustrates a case where a conductive fixation portion 59d is provided in place of the fixation portion 59a according to the present example and the sheet material 58 is removed. FIG. 6B illustrates the present exemplary embodiment in which the fixation portion 59a and the sheet material 58 constitute the fixation portion formed of a non-conductive material.

Arrows 110 illustrated in FIGS. 6A and 6B indicate flows of magnetic fields generated from the coils 53a, 53b, and 53c, respectively. In practice, a larger amount of magnetic field is generated from each of the coils 53a, 53b, and 53c at a higher density than those indicated by the arrows 110 in FIG. 6A. However, to facilitate the explanation of the magnetic field, only typical magnetic fields are schematically illustrated in FIGS. 6A and 6B. In FIG. 6A, each arrow 111 illustrated indicates an induced current that flows to the partitioning member 54, and each arrow 112 indicates a flow of a secondary magnetic field generated from the partitioning member 54.

A case where the conductive fixation portion 59d is provided will now be described with reference to FIG. 6A. The flow of the magnetic field generated from the hollow portion of the coil 53 is generated as indicated by the arrows 110, and the magnetic field interlinks with a loop structure including the holding member 51, the partitioning member 54, and the fixation portion 59 including a screw and reaches the hollow portion side of the coil 53. When the alternating magnetic field interlinks with the loop structure, an induced electromotive force is generated in the loop structure due to electromagnetic induction. Due to this induced electromotive force, an induced current flows to the loop structure and a secondary magnetic field is generated from the loop structure. Also, in the partitioning member 54 that is disposed near the back surface of the electronic unit 6 and constitutes a part of the loop structure, an induced electromotive force is generated with the interlinkage of the magnetic field indicated by each of the arrows 110 and the induced current as indicated by each of the arrows 111 flows. Further, the secondary magnetic field as indicated by each of the arrows 112 is generated from the partitioning member 54 and reaches the electronic unit 6. A projection surface 100 of the partitioning member 54 illustrated in FIG. 6A indicates a projection surface overlapping the surface of the partitioning member 54 that is projected from the direction of the optical axis 4 with respect to the electronic unit 6. The projection surface 100 has a side that is closest to the electronic unit 6 and is longest among the sides of the partitioning member 54. Accordingly, in the loop structure including the holding member 51, the partitioning member 54, and the fixation portion 59 including a screw, particularly the large secondary magnetic field indicated by the arrows 112 which is generated from the projection surface 100 of the partitioning member 54 reaches the electronic unit 6.

Next, Example 1 in which a non-conductive fixation portion is provided using the fixation portion 59a and the sheet material 58 will be described with reference to FIG. 6B. As with the configuration illustrated in FIG. 6A, an induced electromotive force is also generated in the loop structure including the holding member 51, the partitioning member 54, and the fixation portion 59 including a screw. However, as described above, the fixation portion 59a for connecting the holding member 51 and the partitioning member 54 and the sheet material 58 are each formed of a non-conductive material. Accordingly, the fixation portion provided on the fixation portion 59a has a high impedance with respect to the generated induced electromotive force, and the effect of the induced current that flows to the projection surface 100 of the partitioning member 54 on the electronic unit 6 is greatly reduced. Consequently, it is possible to suppress the generation of the secondary magnetic field from the partitioning member 54 included in the loop structure and to reduce the amount of magnetic field that reaches the electronic unit 6.

FIGS. 6A and 6B illustrate an example where a magnetic field is generated when a current flows in one direction of the coil 53. However, in actual driving, an applied voltage by the PWM control is used and alternating components are included in the current, so that the current may vary in the opposite direction. As a result, the magnetic field is generated as a vector in the opposite direction and is oriented in the direction opposite to that in FIGS. 6A and 6B. However, even when the magnetic field is oriented in the opposite direction, the induced current is generated due to the induced electromotive force, and thus the same advantageous effect of providing the non-conductive fixation portion 59a and the non-conductive sheet material 58 can be obtained.

As described above, the yoke 75 is formed in a figure of eight and the side that passes through the central portion of the yoke 75 is opposed to the partitioning member 54. Accordingly, the magnetic field generated from the coil 53 also interlinks with the yoke 75 and the induced electromotive force is generated. However, the yoke 75 is located farther from the electronic unit 6 than the partitioning member 54. Further, since the yoke 75 is formed of a magnetic material, the induced current is less likely to flow and the secondary magnetic field is less likely to be generated. Thus, even when the yoke 75 is present, the same advantageous effect of providing the non-conductive fixation portion 59a and the non-conductive sheet material 58 can be obtained.

As described above, in the drive apparatus 20 including the movable unit 50 on which the electronic unit 6, the coil 53, the holding member 51, and the partitioning member 54 are disposed, the secondary magnetic field generated from the partitioning member 54 due to the magnetic field generated from the coil 53 reaches the electronic unit 6. However, the fixation portion including the non-conductive fixation portion 59a and the non-conductive sheet material 58 is provided between the holding member 51 and the partitioning member 54, thereby making it possible to reduce the effect of the magnetic field on the electronic unit 6, while achieving a reduced size of the apparatus.

In this example, the non-conductive sheet material 58 and the non-conductive screw are provided at the fixation portion 59a. However, this same configuration can also be applied to the other fixation portions 59b and 59c.

In this example, the non-conductive sheet material 58 and the non-conductive fixation portion 59a are provided only at the fixation portion 59a among the fixation portions 59a, 59b, and 59c. However, the same configuration may be provided on each of the plurality of fixation portions 59a, 59b, and 59c. This configuration makes it possible to suppress the generation of the secondary magnetic field from a part of the holding member located between the fixation portions.

In Example 1, the non-conductive fixation portion 59a and the non-conductive sheet material 58 are provided to reduce the effect of the induced current that flows to the projection surface 100 of the partitioning member 54 on the electronic unit 6. In this case, since the projection surface 100 has the side that is closest to the electronic unit 6 and is longest among the sides thereof, the projection surface 100 is a part of the partitioning member 54 in which the largest amount of secondary magnetic field that affects the electronic unit 6 is generated. Like in this example, the non-conductive fixation portion may preferably have the similar configuration as the projection surface 100, which can reduce the induced current that flows to the side that is closest to the electronic unit 6 and is longest among the sides. This configuration is determined depending on a positional relationship between the fixation portion for fixing the holding member 51 and the partitioning member 54 and the longest projection surface of the partitioning member 54 that overlaps the surface projected from the direction of the optical axis 4 with respect to the electronic unit 6. More specifically, all fixation portions located on one of the fixation portions between the holding member 51 and the partitioning member 54 opposed in the length direction of the projection surface of the partitioning member 54 may be desirably formed of a non-conductive material.

For example, like in Example 1, the holding member 51 and the partitioning member 54 may be desirably connected to each other via a non-conductive member at the fixation portion 59a. Alternatively, the fixation portion 59a may be formed of a conductive material and the holding member 51 and the partitioning member 54 may be connected to each other via a non-conductive material at the fixation portions 59b and 59c. This configuration makes it possible to greatly reduce the induced current that flows to the side that is closest to the electronic unit 6 and is longest among the sides. In the configuration in which a non-conductive material fixation portion are provided at each of the fixation portions 59b and 59c, the secondary magnetic field generated from the fixation portion of the fixation portion 59b, the partitioning member 54, and the fixation portion of the fixation portion 59c can also be suppressed. Accordingly, in the length direction of the projection surface of the partitioning member 54, all fixation portions located on a side where there are a greater number of fixation portions, among the fixation portions provided between the holding member 51 and the partitioning member 54, may be preferably formed of a non-conductive material. Accordingly, a part of the fixation portion 59b and a part of the fixation portion 59c may be preferably formed of an insulating material.

The fixation portion 59a and the sheet material 58 are each formed of a non-conductive material. However, any material can be used, as long as the material has a high electrical resistance and can suppress an induced current in the loop structure including the holding member 51, the partitioning member 54, and the fixation portion thereof. Accordingly, the fixation portion 59a and the sheet material 58 may be desirably members having an electrical resistance higher than the holding member 51 and the partitioning member 54.

The fixation portion 59a and the sheet material 58 may have any configuration as long as they are formed of a non-conductive material and constitute the fixation portion for connecting the holding member 51 and the partitioning member 54. Accordingly, for example, a non-conductive coating may be applied to the holding member 51 or the partitioning member 54. Further, the holding member 51 may be provided with a protruding portion and the partitioning member 54 may be provided with a hole, and the projection portion may be inserted into the hole. Alternatively, a non-conductive coating may be applied to the holding member 51 or the partitioning member 54. Further, the holding member 51 may be provided with a hole and a part of the holding member may be inserted into the hole. These configurations make it possible to reduce the effect of the magnetic field on the electronic unit 6, while achieving reduced size and weight of the apparatus.

In Example 1, the holding member 51 and the partitioning member 54 are electrically connected to each other via the fixation portion provided with the fixation portions 59b and 59c. This configuration makes it possible to prevent unwanted electric charging to the partitioning member 54. To prevent such unwanted charging, it may be desirable that the holding member 51 and the partitioning member 54 are electrically connected to each other at at least one of the plurality of fixation portions. The holding member 51 and the partitioning member 54 may be configured to conduct heat from the electronic device 66. In Example 1, if a heat conduction member (not illustrated) may be provided between the electronic unit 6 and the partitioning member 54, the heat generated in the electronic unit 6 can be released to the holding member 51 from the partitioning member 54 through the fixation portion 59b and the fixation portion 59c.

With this configuration, it is possible to reduce the unwanted charging of the partitioning member 54, the radiation of heat from the electronic unit 6, and the effects of the magnetic field on the electronic unit 6, while achieving a reduced size of the apparatus.

COMPARATIVE EXAMPLE 1

Figure 7A:
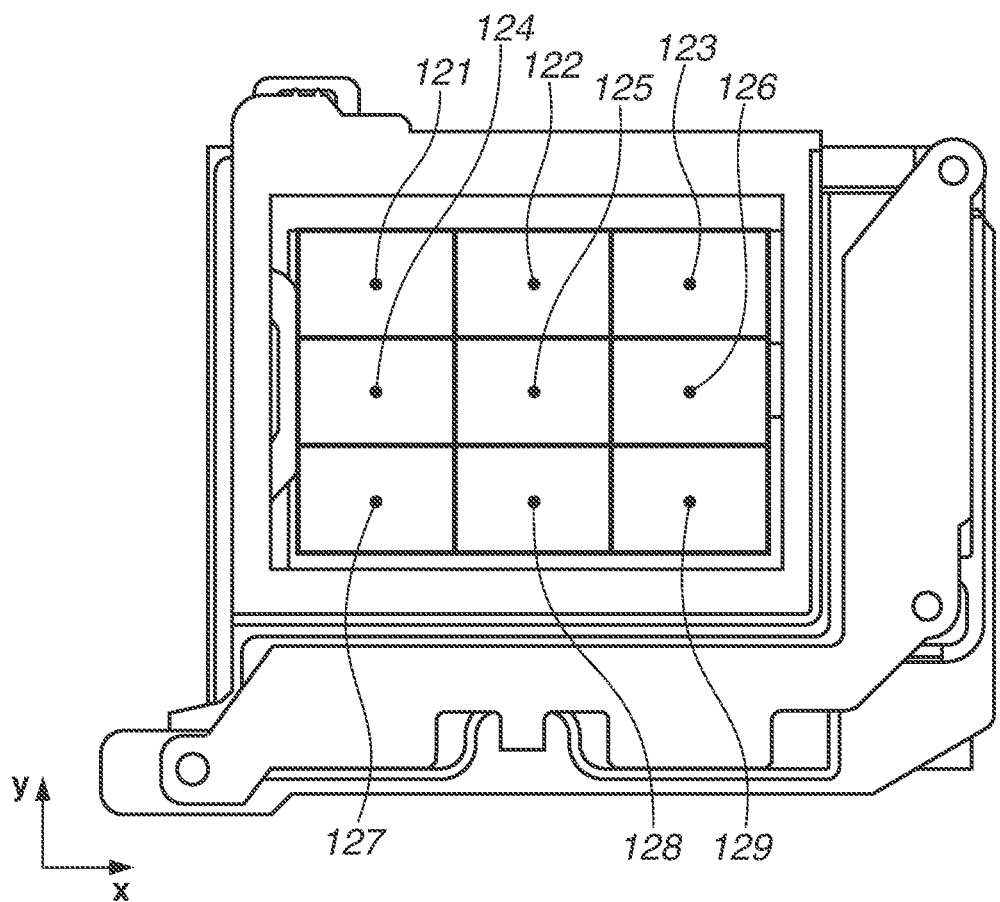
FIG. 7A is schematic view illustrating measurement sections in the drive apparatus.
Figure 7B:
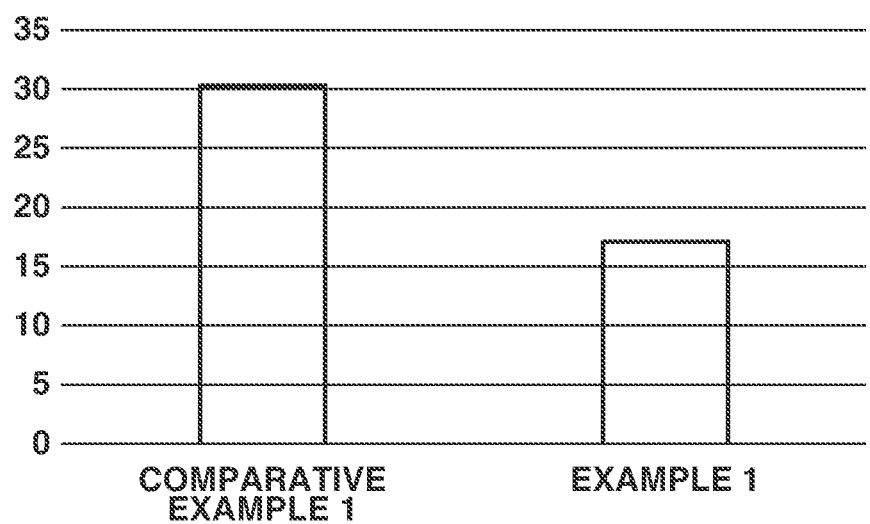
FIG. 7B is a graph illustrating measurement results.

To confirm the advantageous effect of reducing the induced current flowing to the partitioning member 54 in Example 1 described above, a blur correction unit according to Example 1 and a blur correction unit according to Comparative Example 1 were studied by actual measurements. The blur correction unit according to Comparative Example 1 has a different configuration from that of the blur correction unit according to Example 1 in that the partitioning member 54 is removed. As the study method, the magnetic field that reaches the position of the electronic unit 6 was studied by actual measurements in the configurations according to Example 1 and Comparative Example 1. FIGS. 7A and 7B are respectively a diagram illustrating measurement positions and a graph indicating actual measurement results. FIG. 7A illustrates nine measurement points in the drive apparatus 20 as viewed along the direction of the optical axis 4. FIG. 7B is a graph indicating actual measurement results. The magnetic field was actually measured using a commercially-available magnetic field probe with a loop of 1 cm and a spectrum analyzer.

Driving conditions will now be described. Square waves with a frequency of 300 kHz and an amplitude of 5 V were used as voltages applied to three driving coils. This is based on a PWM control waveform with a frequency of 300 kHz and a duty ratio of 50% is used.

Next, the actual measurement method will be described. The portion corresponding to the surface of the electronic unit 6 was divided into nine sections, and the measurements were conducted such that the central point of the magnetic field probe is located at the center of each surface of the nine divided sections. Points 121, 122, 123, 124, 125, 126, 127, 128, and 129 illustrated in FIG. 7A each represent a position where the central point of the magnetic field probe was disposed during the measurements. Each vector for the magnetic field during the measurements has two directions corresponding to the X-axis and the Y-axis perpendicular to the direction of the optical axis 4 as illustrated in FIG. 7A in which the magnetic field greatly affects the electronic unit 6.

FIG. 7B is a graph illustrating the result of comparing the configuration of Comparative Example 1 in which the partitioning member 54 is removed with the configuration of Example 1. A vertical axis in the graph illustrated in FIG. 7B indicates a maximum magnetic flux density [nT] among the nine observation points in two axial directions.

The result illustrated in FIG. 7B shows that the maximum magnetic flux density of the magnetic field that reached the electronic unit 6 was 30.3 [nT] in Comparative Example 1, and was 17.2 [nT] in Example 1. Accordingly, it is obvious that the magnetic field that reaches the position of the electronic unit 6 can be reduced by removing the partitioning member 54. This is because the secondary magnetic field generated from the partitioning member 54 can be reduced by removing the partitioning member 54. The similar advantageous effect can also be obtained in a configuration in which a part of the fixation portion is formed of a non-conductive material, without removing the partitioning member 54.

EXAMPLE 2

The image capturing equipment including a blur correction unit according to Example 2 of the present exemplary embodiment will be described with reference to FIG. 8.

A basic configuration of the image capturing equipment according to Example 2 is similar to that of the image capturing equipment illustrated in FIGS. 4A, 4B, and 4C according to Example 1, and a basic configuration of the drive apparatus 20 is also similar to that of the drive apparatus 20 illustrated in FIGS. 3A and 3B according to Example 1, and thus the descriptions thereof are omitted. Example 2 differs from Example 1 in that the shape of a member 101 which is a part of the partitioning member 54 that is located between a fixation portion 159b provided with the fixation portion 59b and a fixation portion 159c provided with the fixation portion 59c in the partitioning member 54.

Figure 8:
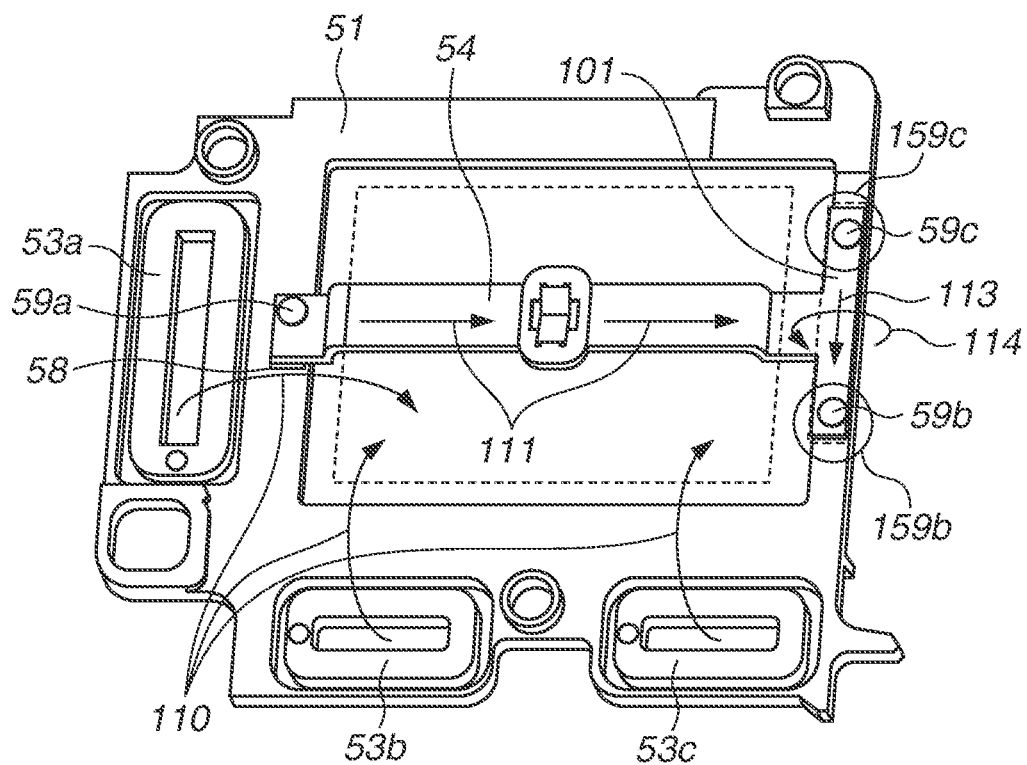
FIG. 8 is a schematic view illustrating the drive apparatus.

FIG. 8 is a perspective view illustrating only the holding member 51, the coils 53, the partitioning member 54, the yoke 56, the magnets 57, the sheet material 58, and the fixation portions 59 including screws in the drive apparatus 20 according to Example 2.

For reference, the contour of the electronic unit 6 is indicated by a dotted line.

The shape of the member 101 which is a part of the partitioning member 54 will be described. As illustrated in FIG. 8, like in Example 1, the fixation portions 159$b$ and 159$c$ that are provided with the fixation portions 59$b$ and 59$c$, respectively, connect the partitioning member 54 and the holding member 51 to thereby establish an electrical connection therebetween. The member 101 which is an extending portion of the partitioning member 54 from the fixation portion 159$b$ to the fixation portion 159$c$ is disposed to avoid the surface where the electronic unit 6 is projected in the direction of the optical axis 4. More specifically, the member 101 is disposed to face the end portion of the holding member 51 at which the fixation portions 159$b$ and 159$c$ are provided.

Next, the effect of the magnetic field generated from each the coils 53 and the effect of employing the configuration in which the member 101, which is a part of the partitioning member 54, is disposed along the holding member 51 will be described. The alternating magnetic field generated from each of the coils 53 as indicated by the arrows 110 interlinks with the loop structure including the holding member 51, the partitioning member 54, and the fixation portion 59 including a screw, thereby causing an induced electromotive force in the loop structure. In Example 2, the non-conductive fixation portion 59$a$ and the non-conductive sheet material 58 are provided, as with Example 1. Accordingly, the induced current indicated by each of the arrows 111 that flows to a part of the partitioning member 54 disposed from the fixation portion 59$a$ toward the fixation portion 159$b$ and the fixation portion 159$c$ can be reduced and the generation of the secondary magnetic field can be suppressed. As described above, the holding member 51 and the partitioning member 54 are electrically connected to each other through the fixation portion 159$b$ and the fixation portion 159$c$. Therefore, due to the magnetic field generated from each of the coils 53 as indicated by the arrows 110, an induced current indicated by an arrow 113 flows to the fixation portion 159$b$, the member 101, which is a part of the partitioning member 54, and the fixation portion 159$c$. As a result, a secondary magnetic field indicated by an arrow 114 is generated from the member 101. In this case, the member 101 is disposed to avoid the surface where the electronic unit 6 is projected in the direction of the optical axis 4. This configuration prevents the member 101 to which the induced current flows from being disposed immediately below the electronic unit 6 and increases the distance between the electronic unit 6 and the member 101. Accordingly, the amount of magnetic field that reaches the electronic unit 6 from the member 101 can be reduced. The member 101 has a shape matching the shape of the holding member 51. Consequently, the shielding effect by the holding member 51 and the base plate 71 can also be obtained, and the amount of magnetic field that reaches the electronic unit 6 can be further reduced.

As described above, in the drive apparatus 20 including the movable unit 50 on which the electronic unit 6, the coil 53, the holding member 51, and the partitioning member 54 are disposed, the secondary magnetic field generated from the partitioning member 54 due to the magnetic field generated from each of the coil 53 reaches the electronic unit 6. However, the member 101, which is a part of the partitioning member 54, is disposed to avoid the surface where the electronic unit 6 is projected in the direction of the optical axis 4, thereby making it possible to reduce the effect of the magnetic field on the electronic unit 6, while achieving a reduced size of the apparatus.

The holding member 51 and the partitioning member 54 are electrically connected through the fixation portion 159$b$ and the fixation portion 159$c$. Accordingly, it is possible to reduce unwanted charging to the partitioning member 54, the radiation of heat from the electronic unit 6, and the adverse effects of the magnetic field on the electronic unit 6, while achieving a reduced size of the apparatus.

The equipment including the drive apparatus 20 according to the present exemplary embodiment is not limited to the image capturing equipment such as a camera, but instead may be, for example, electronic equipment such as a smartphone and a personal computer, display equipment such as a television and a display, or transportation equipment such as a vehicle, a ship, and a flight vehicle. Yet alternatively, the equipment may be, for example, medical equipment, such as an endoscope or a radio diagnosis apparatus, measurement equipment such as a measurement sensor, analysis equipment such as an electron microscope, office equipment such as a printer, a scanner, or a copying machine, or industrial equipment such as a robot or a manufacturing apparatus. When the various types of equipment as described above as examples employ the configuration of the drive apparatus 20, the generation of induced noise can be suppressed.

According to the present exemplary embodiment, it is possible to provide a technique that is advantageous in suppressing generation of noise in an electronic device.

The exemplary embodiment described above can be modified as appropriate without departing from the technical idea of the disclosure. The disclosed content of the present specification includes not only the content described in the present specification, but also all matters that are comprehensible from the present specification and the drawings attached to the present specification.

In the illustrated specific numerical ranges, "e" to "f" ("e" and "f" are numbers) indicate a range of "e" or more and/or "f" or less. In the illustrated specific numerical ranges, when a range from "i" to "j" and a range from "m" to "n" ("i", "j", "m", and "n" are numbers) are written at the same time, a pair of a lower limit and an upper limit is not limited to a pair of "i" or "j" and a pair of "m" and "n".

For example, a consideration may be made using a plurality of pairs of the lower limit and the upper limit in combination. Specifically, if the range from "i" to "j" and the range from "m" to "n" are written at the same time, a consideration may be made in the range from "i" to "n", or a consideration may be made in the range from "m" to "j".

The disclosed content of the present specification also includes complementary sets of concepts described in the present specification. Specifically, when the present specification describes that "A is larger than B", for example, it can be said that the present specification discloses that "A is not larger than B", even if the description that "A is not larger than B" is omitted. This is because the present specification is provided based on the premise that the description of "A is larger than B" takes into consideration a case where "A is not larger than B".

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-198283, filed Nov. 30, 2020, which is hereby incorporated by reference herein in its entirety.

What is claimed is:

1. A drive apparatus comprising:
   a first unit including a coil;
   a second unit including a magnet; and
   a third unit including an electronic device,
   wherein the third unit is fixed to the first unit, and the first unit and the third unit are configured to move relative to the second unit by a magnetic force between the coil and the magnet,
   wherein the first unit includes a first opening and a second opening in a direction along a principal surface of the electronic device in an area overlapping the principal surface, and
   wherein the first unit is configured such that an induced current due to a magnetic field generated from the coil does not flow to a first portion located between the first opening and the second opening in the first unit.

2. The drive apparatus according to claim 1, wherein the first unit is configured such that the induced current due to the magnetic field generated from the coil flows to a second portion that is not located between the first opening and the second opening in the first unit.

3. The drive apparatus according to claim 1, wherein the first portion is formed of a conductive body.

4. The drive apparatus according to claim 1, wherein the magnet included in the second unit is a first magnet and the first unit includes a second magnet fixed to the first portion.

5. The drive apparatus according to claim 4, wherein the second unit includes a yoke coupled to the first magnet and a part of the yoke is opposed to the second magnet.

6. The drive apparatus according to claim 1, wherein the magnet included in the second unit is a first magnet, the second unit further includes a third magnet opposed to the first magnet, and the coil is disposed between the first magnet and the third magnet.

7. The drive apparatus according to claim 1, wherein the third unit includes a wiring board on which the electronic device is mounted, and the wiring board is provided between the electronic device and the first portion.

8. The drive apparatus according to claim 1, wherein a distance between the first portion and the electronic device is less than 10 mm.

9. The drive apparatus according to claim 1,
   wherein the first unit includes:
   a first member configured to hold the coil, and
   a second member located between the first opening and the second opening,
   wherein the first opening and the second opening are defined by the first member and the second member, and
   wherein the first unit is configured such that the induced current due to the magnetic field generated from the coil does not flow to the second member.

10. The drive apparatus according to claim 9, wherein the second member is configured to conduct heat from the electronic device.

11. The drive apparatus according to claim 9,
    wherein the second member holds a magnetic body, and
    wherein the second unit is configured such that the first member and the second unit attract each other by a second unit magnetic force between the magnetic body and the second unit.

12. The drive apparatus according to claim 1, wherein the electronic device is an image capturing device or a display device.

13. An equipment comprising:
    the drive apparatus according to claim 1; and
    a control unit configured to supply a current to the coil.

14. The equipment according to claim 13, further comprising a detection unit configured to detect a physical quantity corresponding to a displacement of the electronic device,
    wherein the displacement of the electronic device is corrected by the relative movement of the first unit and the third unit to the second unit.

15. A drive apparatus comprising:
    a first unit including a coil;
    a second unit including a magnet; and
    a third unit including an electronic device,
    wherein the third unit is fixed to the first unit, and the first unit and the third unit are configured to move relative to the second unit by a magnetic force between the coil and the magnet,
    wherein the first unit includes a first opening and a second opening in a direction along a principal surface of the electronic device in an area overlapping the principal surface,
    wherein the first unit includes a first portion located between the first opening and the second opening,
    wherein the first unit is configured such that an induced current due to a magnetic field generated from the coil flows to a second portion that is not located between the first opening and the second opening in the first unit, and
    wherein the first unit is configured such that a current larger than the induced current flowing to the second portion does not flow to the first portion.

16. A drive apparatus comprising:
    a first unit including a coil;
    a second unit including a magnet; and
    a third unit including an electronic device,
    wherein the third unit is fixed to the first unit, and the first unit and the third unit are configured to move relative to the second unit by a magnetic force between the coil and the magnet,
    wherein the first unit includes:
    a first member configured to hold the coil,
    a second member having one of a plate shape or a rod shape and at least partially overlapping the electronic device, and
    a plurality of fixation portions, each for fixing a plurality of end portions of the first member and the second member, and
    wherein at least one of a part of one of the plurality of fixation portions or a part of the second member is formed of an insulating material.

17. The drive apparatus according to claim 16, wherein the part of the second member is formed of a conductive body.

18. The drive apparatus according to claim 16,
    wherein the plurality of fixation portions includes a first fixation portion, a second fixation portion, and a third fixation portion,
    wherein a distance between the first fixation portion and the second fixation portion and a distance between the first fixation portion and the third fixation portion are greater than a distance between the second fixation portion and the third fixation portion, and
    wherein a part of the second fixation portion and a part of the third fixation portion are formed of the insulating material.

19. The drive apparatus according to claim 16, wherein the part of the one of the plurality of fixation portions is an insulating sheet material provided between the first member and the second member.

20. The drive apparatus according to claim 16, wherein the part of the second member is an insulating coating material, and where the coating material is configured to cover a conductive material of the second member and to be in contact with the first member.

* * * * *